(12) United States Patent
Ichishi

(10) Patent No.: US 8,504,227 B2
(45) Date of Patent: Aug. 6, 2013

(54) CHARGING CONTROL DEVICE AND CHARGING CONTROL METHOD

(75) Inventor: Masato Ichishi, Kasugai (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 450 days.

(21) Appl. No.: 12/738,755

(22) PCT Filed: Nov. 14, 2008

(86) PCT No.: PCT/JP2008/070768
§ 371 (c)(1),
(2), (4) Date: Apr. 19, 2010

(87) PCT Pub. No.: WO2009/069481
PCT Pub. Date: Jun. 4, 2009

(65) Prior Publication Data
US 2010/0217485 A1    Aug. 26, 2010

(30) Foreign Application Priority Data
Nov. 30, 2007    (JP) .................................. 2007-310589

(51) Int. Cl.
*H02J 7/00*    (2006.01)
(52) U.S. Cl.
USPC .......................................... 701/22; 701/29.3
(58) Field of Classification Search
USPC .................. 701/22, 36, 99, 293.1, 29.3, 29.6,
701/31.4, 34.4, 29.1; 340/455, 636.1, 636.11,
340/636.18, 636.12; 320/138, 148, 149,
320/155; 903/904, 907; 180/65.27, 65.275,
180/65.29
See application file for complete search history.

(56) References Cited

U.S. PATENT DOCUMENTS 5,305,613 A * 4/1994 Hotta et al. ..................... 62/209
5,467,006 A * 11/1995 Sims ................................. 237/5

(Continued)

FOREIGN PATENT DOCUMENTS

JP    A-5-56508    3/1993
JP    A-8-110999   4/1996

(Continued)

OTHER PUBLICATIONS

Jul. 5, 2012 Search Report issued in European Patent Application No. 08853726.1.

(Continued)

*Primary Examiner* — Khoi Tran
*Assistant Examiner* — Jason Holloway
(74) *Attorney, Agent, or Firm* — Oliff & Berridge, PLC

(57)    ABSTRACT

A charging control device is a charging control device for independently controlling charging of power storage devices in a plurality of vehicles, respectively, each having the power storage device mounted thereon, from an external power supply, in which a control ECU detects a state of charge of the power storage device when each vehicle and the external power supply are coupled to each other, detects an expected amount of power consumption for each of the plurality of vehicles, calculates a required amount of power to be charged for each vehicle based on the detected state of charge and the expected amount of power consumption, detects a time to start use of each vehicle, determines a charging schedule of a charging time period and an amount of power to be charged for each vehicle based on the required amount to be charged and the time to start use, and controls charging of the power storage devices mounted on the vehicles according to the charging schedule. A charging control device and a charging control method achieving increased possibility that a vehicle desired to be used can be used at a desired time of use, while performing charging within contract power can be provided.

6 Claims, 7 Drawing Sheets

U.S. PATENT DOCUMENTS

| | | | |
|---|---|---|---|
| 5,594,318 A | 1/1997 | Nor et al. | |
| 5,656,916 A * | 8/1997 | Hotta | 320/160 |
| 5,892,346 A | 4/1999 | Moroto et al. | |
| 6,185,487 B1 * | 2/2001 | Kondo et al. | 701/22 |
| 6,850,898 B1 * | 2/2005 | Murakami et al. | 705/13 |
| 7,181,409 B1 | 2/2007 | Murakami et al. | |
| 7,679,336 B2 * | 3/2010 | Gale et al. | 320/155 |
| 7,693,609 B2 * | 4/2010 | Kressner et al. | 700/291 |
| 7,949,435 B2 * | 5/2011 | Pollack et al. | 700/291 |
| 2004/0130292 A1 * | 7/2004 | Buchanan et al. | 320/116 |
| 2004/0169489 A1 * | 9/2004 | Hobbs | 320/104 |
| 2005/0228553 A1 | 10/2005 | Tryon | |
| 2006/0028178 A1 * | 2/2006 | Hobbs | 320/128 |
| 2008/0039989 A1 * | 2/2008 | Pollack et al. | 701/22 |
| 2008/0052145 A1 * | 2/2008 | Kaplan et al. | 705/8 |
| 2008/0203973 A1 * | 8/2008 | Gale et al. | 320/157 |
| 2008/0281663 A1 * | 11/2008 | Hakim et al. | 705/8 |
| 2009/0062967 A1 * | 3/2009 | Kressner et al. | 700/286 |
| 2009/0091291 A1 * | 4/2009 | Woody et al. | 320/109 |

FOREIGN PATENT DOCUMENTS

| | | |
|---|---|---|
| JP | A-8-116626 | 5/1996 |
| JP | A-10-80071 | 3/1998 |
| JP | A-10-262305 | 9/1998 |
| JP | A-2000-209707 | 7/2000 |
| JP | A-2001-60293 | 3/2001 |
| JP | A-2002-369315 | 12/2002 |
| JP | A-2006-74868 | 3/2006 |
| WO | WO 2005/008808 A2 | 1/2005 |

OTHER PUBLICATIONS

International Search Report mailed on Dec. 22, 2008 in corresponding international application No. PCT/JP2008/070768 (with translation).

* cited by examiner

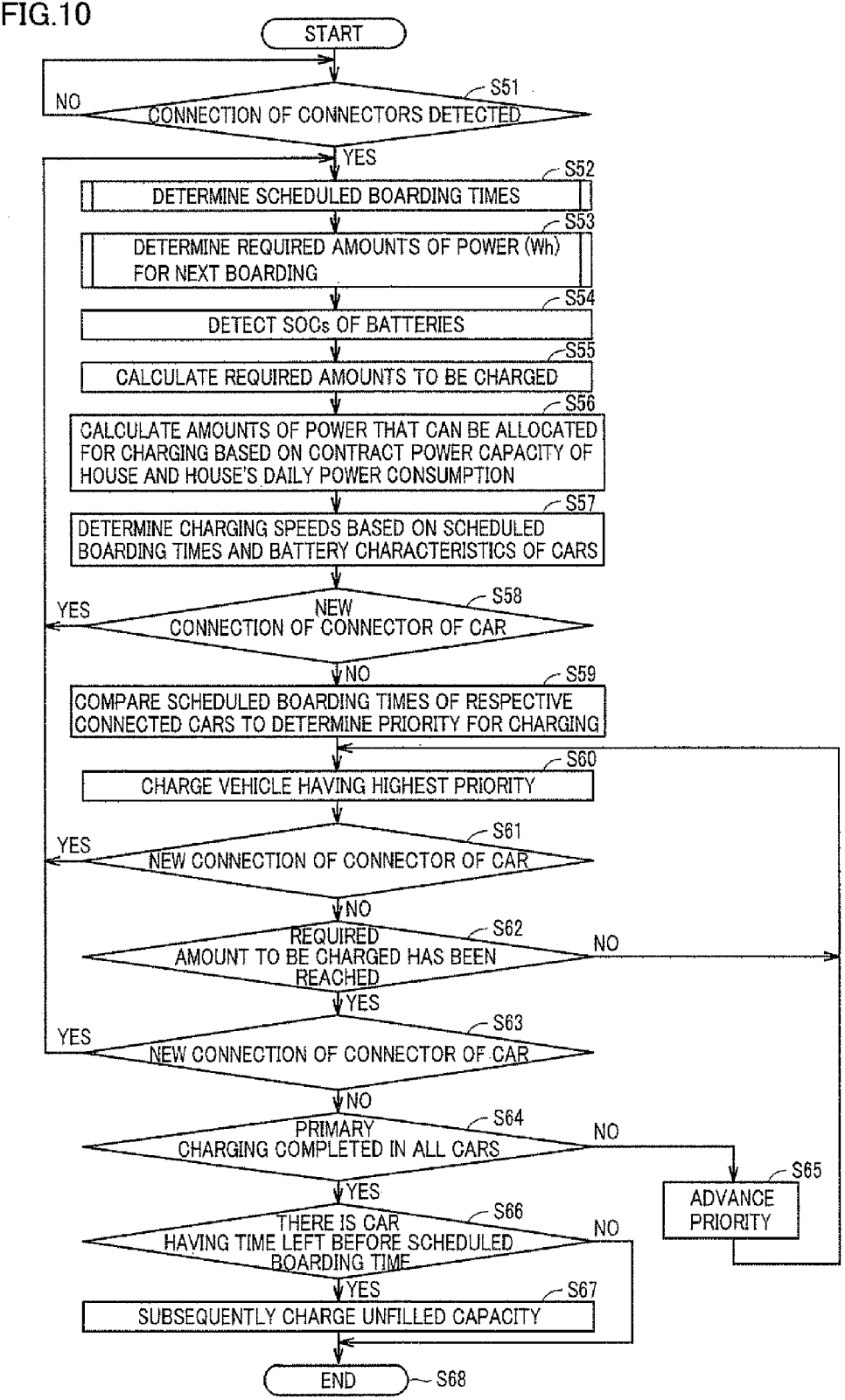

CHARGING CONTROL DEVICE AND CHARGING CONTROL METHOD

TECHNICAL FIELD

The present invention relates to a charging control device and a charging control method, and more particularly to a charging control device and a charging control method for controlling charging of a plurality of vehicles each having a power storage device mounted thereon, from outside the vehicles.

BACKGROUND ART

In recent years, electric cars, hybrid cars, fuel cell cars and the like having a power storage device and a motor as a driving mechanism mounted thereon have attracted attention as environmentally friendly vehicles. Electric cars are charged from outside, and studies have been conducted to implement hybrid cars that can also be charged from outside.

Japanese Patent Laying-Open No. 2001-60293 (Patent Document 1) discloses a vehicle sharing system of electric vehicles, for allocating a vehicle with the highest state of charge to a user.

Patent Document 1: Japanese Patent Laying-Open No. 2001-60293

Patent Document 2: Japanese Patent Laying-Open No. 2006-74868

DISCLOSURE OF THE INVENTION

Problems to be Solved by the Invention

From the viewpoint of a problem in recent years of reducing amounts of carbon dioxide emission and the like, it is expected that charging will take place at houses, housing complexes and the like in possession of a plurality of electric cars and hybrid cars that emit low amounts of carbon dioxide and can be charged from outside.

Such charging at houses suffers from the following three problems. 1) If cars are charged successively in order of arrival or the like, it takes time to complete charging of a vehicle that arrived late, which may result in unavailability of a car desired to be used at a desired time of use. 2) When a plurality of hybrid cars and electric cars are charged from a household commercial power supply at a time, a breaker may be blown due to power consumption combined with other loads. 3) Increasing ampere capacity of contract power with an electric power company in accordance with the number of cars results in an increase in contract fee, which is undesirable to a user.

That is, due to variations in time to come home, required amount to be charged, and time to use the vehicle, as well as the limitation that contract power cannot be exceeded, charging at these places results in an incompletely charged vehicle at the time to start using the vehicle unless these conditions are satisfied.

An object of the present invention is to provide a charging control device and a charging control method achieving increased possibility that a vehicle desired to be used can be used at a desired time of use, while performing charging within contract power.

Means for Solving the Problems

In summary, the present invention is directed to a charging control device for independently controlling charging of power storage devices in a plurality of vehicles, respectively, each having the power storage device mounted thereon, from an external power supply, including a state-of-charge detection unit for detecting a state of charge of each of the power storage devices when each vehicle and the external power supply are coupled to each other, an expected power consumption calculation unit for detecting an expected amount of power consumption for each of the plurality of vehicles, a required-amount-of-power-to-be-charged calculation unit for calculating a required amount of power to be charged for each vehicle based on the detected state of charge and the expected amount of power consumption, a use time detection unit for detecting a time to start use of each vehicle, a charging schedule setting unit for determining a charging schedule of a charging time period and an amount of power to be charged for each vehicle based on the required amount to be charged and the time to start use, and a control unit for causing the power storage device mounted on the vehicle to be charged according to the charging schedule.

Preferably, the charging control device further includes a charge efficiency calculation unit for calculating charge efficiency of each power storage device. The charging schedule setting unit sets the charging schedule further based on the charge efficiency.

Preferably, the charging control device further includes a preparatory air conditioning information acquiring unit for acquiring instruction information about preparatory air conditioning prior to start of operation which is set in at least any of the plurality of vehicles. An expected-amount-of-power-consumption detection unit calculates the expected amount of power consumption including power required for the preparatory air conditioning as well. The charging schedule setting unit sets the charging schedule based on the instruction for the preparatory air conditioning.

Preferably, the control unit causes the power storage device in each of the plurality of vehicles to be charged with its required amount of power to be charged, and then continues to cause the power storage device to be charged to full charge beyond the required amount of power to be charged in at least any of the vehicles.

Preferably, the control unit acquires a vehicle type from each of the vehicles. The charging schedule setting unit determines the charging schedule based on the vehicle type.

Preferably, the vehicle includes an internal combustion engine and a fuel tank for storing fuel for the internal combustion engine. The charging schedule setting means sets the charging schedule based on a remaining amount of fuel in the fuel tank.

According to another aspect, the present invention is directed to a charging control method for independently controlling charging of power storage devices in a plurality of vehicles, respectively, each having the power storage device mounted thereon, from an external power supply, including the steps of detecting a state of charge of each of the power storage devices when each vehicle and the external power supply are coupled to each other, detecting an expected amount of power consumption for each of the plurality of vehicles, calculating a required amount of power to be charged for each vehicle based on the detected state of charge and the expected amount of power consumption, detecting a time to start use of each vehicle, determining a charging schedule of a charging time period and an amount of power to be charged for each vehicle based on the required amount to be charged and the time to start use, and charging the power storage device mounted on the vehicle according to the charging schedule.

Effects of the Invention

According to the present invention, it is more likely that charging is completed without increasing an amount of contract power, which allows use of a vehicle desired to be used at a desired time of use.

BRIEF DESCRIPTION OF THE DRAWINGS

FIG. 10 is a flowchart for explaining a process executed when a plurality of vehicles are charged.

DESCRIPTION OF THE REFERENCE SIGNS

Figure 1:
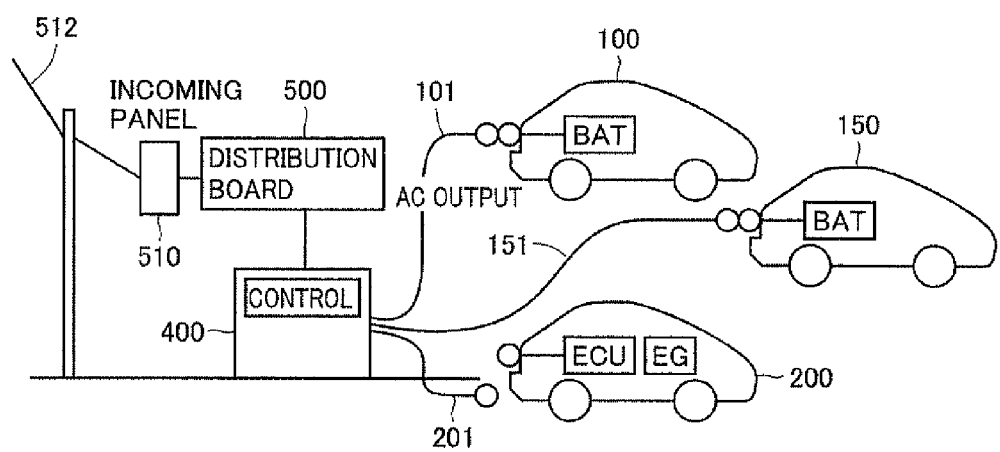
FIG. 1 is a schematic diagram for explaining a mode of using a charging control device 400 according to the present embodiment.

100, 150, 200 vehicle; 101, 151, 201, 418, 428 charging cable; 102, 202 main battery; 103, 203 temperature sensor; 104, 204, 226 inverter; 106 motor; 108 wheel; 110, 210 charging AC/DC conversion unit; 112, 212, 409 input and output interface; 114, 214, 408 main control ECU; 116, 216, 410, 420 power line communication unit; 120, 220, 417, 427 connector connection detection unit; 122, 222, 414, 424 switch; 124, 224, 416, 426 connector; 206, 228 motor generator; 208 wheel; 232 engine; 234 fuel tank; 400 charging control device; 402 AC power supply; 404 current limitation unit; 500 distribution board; 510 incoming panel; 512 power distribution line.

BEST MODES FOR CARRYING OUT THE INVENTION

In the following, embodiments of the present invention will be described in detail with reference to the drawings. It is noted that the same or corresponding components have the same reference characters in the drawings, and description thereof will not be repeated.

FIG. 1 is a schematic diagram for explaining a mode of using a charging control device 400 according to the present embodiment.

Referring to FIG. 1, charging control device 400 independently controls charging of power storage devices (such as batteries and high-capacity capacitors) in a plurality of vehicles 100, 150, 200, respectively, each having the power storage device mounted thereon, from an external power supply.

The external power supply is a commercial power supply, for example, and is supplied from a power distribution line 512 via an incoming panel 510 to a distribution board 500 which branches to load circuits.

Distribution board 500 is connected to charging control device 400 representing one of the load circuits. Charging control device 400 is connected to vehicles 100, 150, 200 as needed through charging cables 101, 151, 201, respectively. The vehicle may be an electric car (100, 150) having a battery and a motor mounted thereon, or a hybrid car (200) having an engine in addition to a battery and a motor mounted thereon.

At houses, offices and the like, timings for vehicles to return to a garage or a parking lot vary, states of charge (SOC) of power storage devices such as batteries in the vehicles also vary, and points in time when the respective vehicles are desired to be used next time vary as well.

Further, there is a limit of power that can be allocated for charging, the limit being determined by contents of a contract (referred to as contract ampere, contract current, contract capacity, etc.) with an electric power company and battery performance. In order to increase the power that can be allocated for charging, the contents of the contract may be changed for installing a contract breaker of higher current capacity, however, it is desired to keep contract capacity at a minimum to avoid an increase in basic electricity fee.

Charging control device 400 performs control such that the vehicles are charged as efficiently as possible within coverage of the contract with the electric power company.

Figure 2:
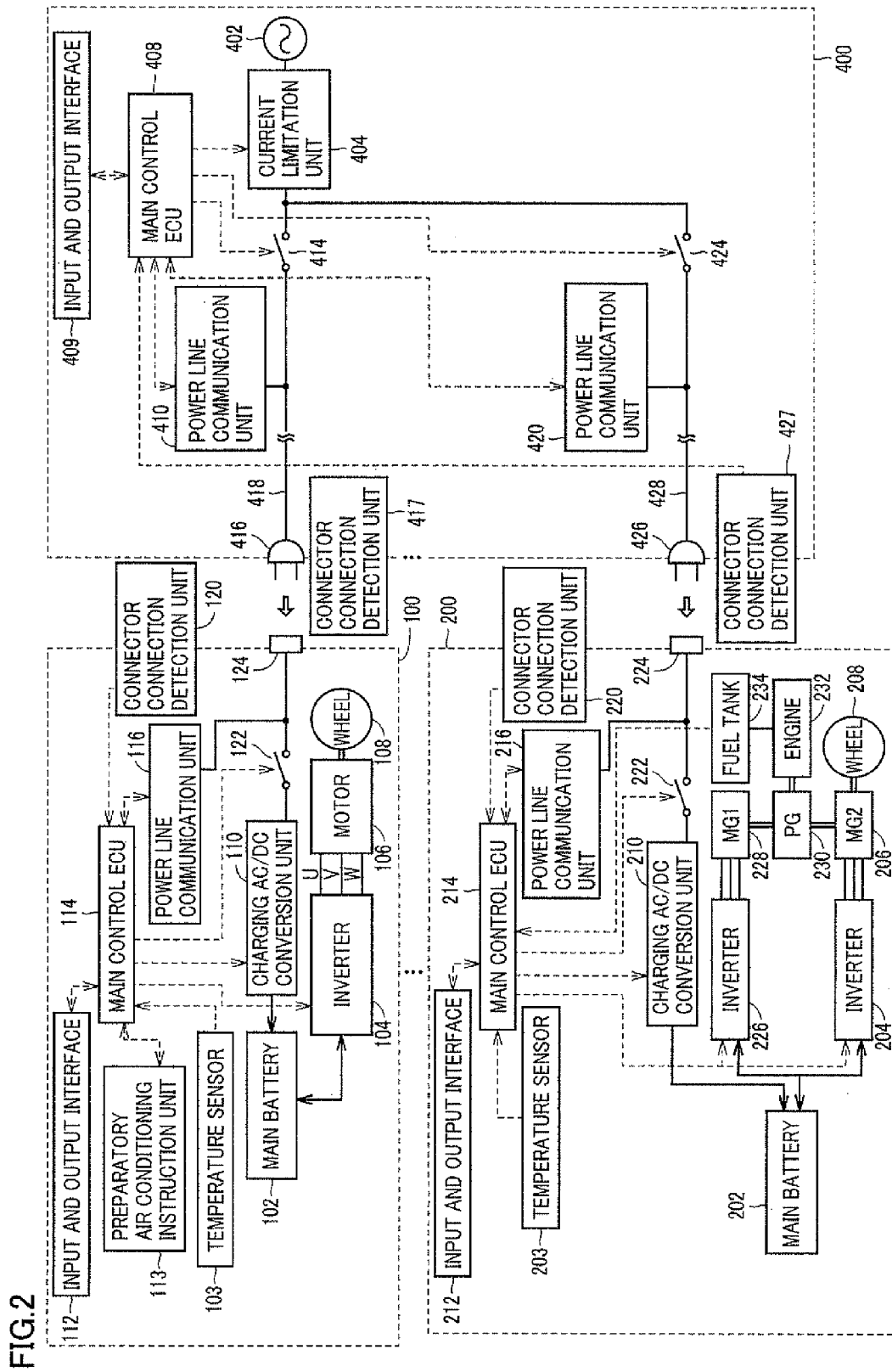
FIG. 2 is a block diagram illustrating arrangement of vehicles and a charging device in further detail.

FIG. 2 is a block diagram illustrating arrangement of the vehicles and a charging device in further detail.

Referring to FIGS. 1 and 2, vehicle 100 includes a wheel 108, a motor 106 for driving wheel 108, an inverter 104 for providing three-phase AC power to motor 106, a main battery 102 for supplying DC power to inverter 104, and a main control ECU 114 for controlling inverter 104. Namely, vehicle 100 is an electric car.

Vehicle 100 includes an arrangement that allows charging of main battery 102 from outside. That is, vehicle 100 further includes a connector 124 provided with a terminal supplied with a commercial power supply such as AC 100V from outside, a charging AC/DC conversion unit 110 for converting the AC power provided to connector 124 into DC power and providing the resultant power to main battery 102, a switch 122 for connecting connector 124 and charging AC/DC conversion unit 110 to each other, a connector connection sensing unit 120 for sensing connection of a connector 416 of charging control device 400 to connector 124, and a power line communication unit 116.

Main control ECU 114 monitors a state of charge SOC of main battery 102, and senses the connection of the connector by means of connector connection sensing unit 120. If the state of charge SOC is lower than a prescribed value when connector 416 is connected to connector 124, main control ECU 114 causes switch 122 to make a transition from an opened state to a connected state, to operate charging AC/DC conversion unit 110 to thereby charge main battery 102.

Vehicle 100 further includes a temperature sensor 103 for sensing a temperature of the main battery. Main control ECU 114 limits input and output power to/from the battery such that the battery temperature does not exceed an upper limit value, by controlling inverter 104 and charging AC/DC conversion unit 110.

Although vehicle 100 is an electric car, the present invention is also applicable to a hybrid vehicle using both a motor and an engine for driving. That is, vehicle 200 is a hybrid car, and includes a wheel 208, a second motor generator 206 for driving wheel 208, an inverter 204 for providing three-phase AC power to second motor generator 206, as well as a fuel tank 234, an engine 232, a first motor generator 228 mainly for generating power, and an inverter 226 for converting three-phase AC power generated by first motor generator 228 into a direct current.

Vehicle 200 further includes a main battery 202 to be charged with power generated by inverter 226 and for supplying DC power to inverter 204, and a main control ECU 214 for controlling inverters 204 and 226.

Like vehicle 100, vehicle 200 also includes an arrangement that allows charging of main battery 202 from outside. That is, vehicle 200 further includes a connector 224 provided with a terminal supplied with a commercial power supply such as AC 100V from outside, a charging AC/DC conversion unit 210 for converting the AC power provided to connector 224 into DC power and providing the resultant power to main battery 202, a switch 222 for connecting connector 224 and charging AC/DC conversion unit 210 to each other, a connector connection sensing unit 220 for sensing connection of a connector 426 of charging control device 400 to connector 224, and a power line communication unit 216.

Main control ECU 214 monitors a state of charge SOC of main battery 202, and senses the connection of the connectors by means of connector connection sensing unit 220. If the state of charge SOC is lower than a prescribed value when connector 426 is connected to connector 224, main control ECU 214 causes switch 222 to make a transition from an opened state to a connected state, to operate charging AC/DC conversion unit 210 to thereby charge main battery 202.

Vehicle 200 further includes a temperature sensor 203 for sensing a temperature of the main battery. Main control ECU 214 limits input and output power to/from the battery such that the battery temperature does not exceed an upper limit value, by controlling inverters 204, 226 and charging AC/DC conversion unit 210.

It is noted that inverters 204, 226 for driving the motors may be used as inverters for charging, as another system arrangement in a vehicle that can be charged. For example, the arrangement may be such that power is supplied and received between a neutral point of a stator coil in second motor generator 206 and a neutral point of a stator coil in first motor generator 228 and outside.

Charging control device 400 includes a power line communication unit 410 for receiving information about the state of charge SOC, a power feed request and the like from vehicle 100, an AC power supply 402, a current limitation unit 404 for limiting a current supplied from AC power supply 402, a charging cable 418, connector 416 provided at an end portion of charging cable 418, a connector connection detection unit 417 for detecting connection of connector 416 to the vehicle, a switch 414 for connecting AC power supply 402 to charging cable 418 with current limitation unit 404 interposed therebetween, and a main control ECU 408 for controlling opening and closing of switch 414.

Charging control device 400 further includes a power line communication unit 420 for receiving information about the state of charge SOC, a power feed request and the like from vehicle 200, a charging cable 428, connector 426 provided at an end portion of charging cable 428, a connector connection detection unit 427 for detecting connection of connector 426 to the vehicle, and a switch 424 for connecting AC power supply 402 to charging cable 428 with current limitation unit 404 interposed therebetween. Opening and closing of switch 424 is controlled by main control ECU 408.

Although not shown, it is noted that charging control device 400 can be connected to more vehicles other than vehicles 100, 200. In that case, a single connector or a plurality of connectors, connector connection units, cables, and power line communication units corresponding in number to the number of connectable vehicles are further provided.

The charging control device of the present embodiment is charging control device 400 for independently controlling charging of power storage devices in a plurality of vehicles, respectively, each having the power storage device mounted thereon, from an external power supply, in which main control ECU 408 detects a state of charge of the power storage device when each vehicle and the external power supply are coupled to each other, detects an expected amount of power consumption for each of the plurality of vehicles, calculates a required amount of power to be charged for each vehicle based on the detected state of charge and the expected amount of power consumption, detects a time to start use of each vehicle, determines a charging schedule of a charging time period and an amount of power to be charged for each vehicle based on the required amount to be charged and the time to start use, and controls charging of the power storage device mounted on the vehicle according to the charging schedule.

Figure 3:
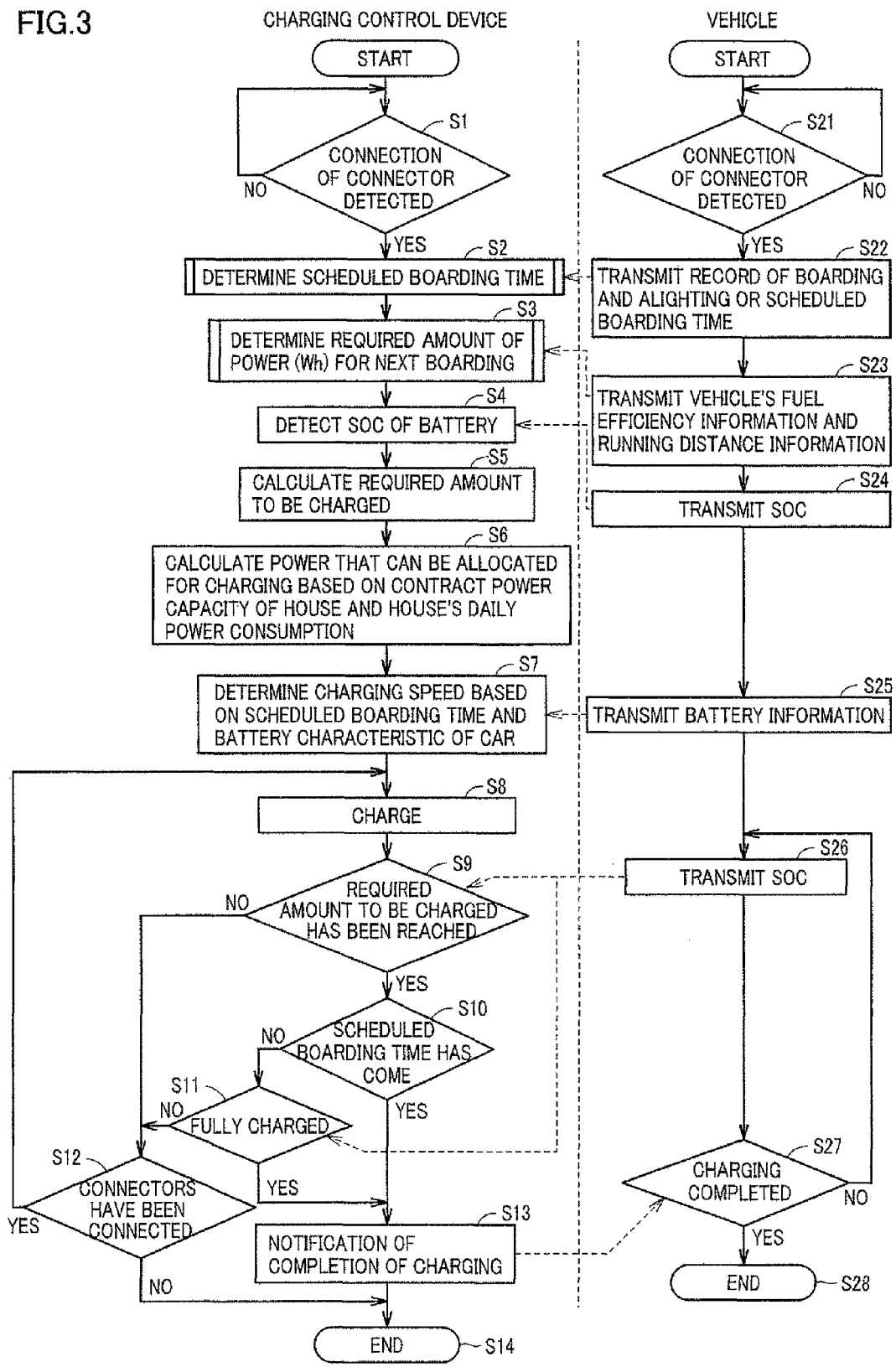
FIG. 3 is a flowchart for explaining control executed in the charging control device and the vehicle.

FIG. 3 is a flowchart for explaining control executed in the charging control device and the vehicle. For brevity of explanation, a case where only one vehicle is connected will be described with reference to FIG. 3, and a case where a plurality of vehicles are connected will be described thereafter with reference to FIG. 10.

Referring to FIGS. 2 and 3, upon start of the process, the charging control device detects connection of the connector at step S1. Main control ECU 408 repeats the processing of step S1 until a signal indicating connection of the connector is detected by either connector connection detection unit 417 or 427.

The vehicle similarly detects connection of the connector at step S21. Main control ECU 114 repeats the processing of step S21 until a signal indicating connection of the connector is detected by a connector connection detection unit 120.

Upon connection of the connector, the process proceeds from step S1 to step S2 in the charging control device, and the process proceeds from step S21 to step S22 in the vehicle. At step S22, main control ECU 114 or 214 in the vehicle transmits a record of boarding and alighting or a scheduled boarding time to charging control device 400. The transmission is made through charging cable 418 or 428, power line communication unit 116 or 216, and power line communication unit 410. The transmission may be made by using other transmission and reception means, such as dedicated communication lines different from the power lines or radio communication. For example, a boarding time and an alighting time may be recorded for each trip in the vehicle, and boarding times and alighting times for about a month may be transmitted as the record of boarding and alighting. Alternatively, when a scheduled boarding time is transmitted, main control ECU 114 or 214 in the vehicle may send an inquiry to a driver through an input and output interface 112 or 212 at the time of alighting prior to start of charging, store the input scheduled boarding time for the next boarding, and transmit that information.

At step S2, charging control device 400 determines a scheduled boarding time based on the record of boarding and alighting or the scheduled boarding time transmitted from the vehicle.

Figure 4:
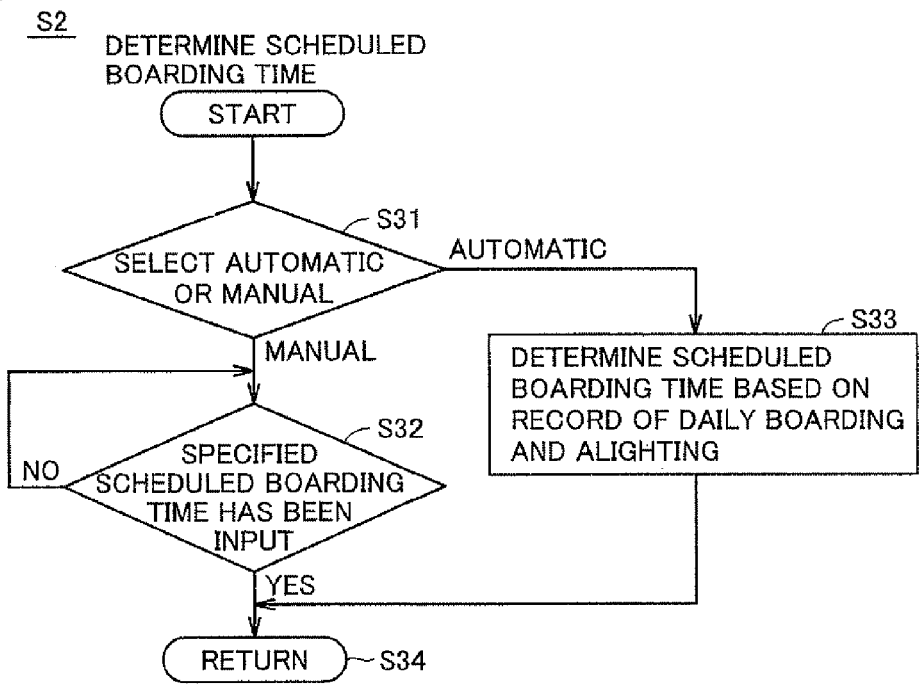
FIG. 4 is a flowchart illustrating details of processing at step S2.

FIG. 4 is a flowchart illustrating details of the processing of step S2.

Referring to FIG. 4, first at step S31, automatic or manual is selected. Selection between an automatic mode and a manual mode may be specified by the vehicle, or a mode set in advance in the charging device may be forcibly selected. If the automatic mode is selected at step S31, the process proceeds to step S33, where main control ECU 408 determines the scheduled boarding time of this vehicle based on the record of daily boarding and alighting transmitted from the vehicle.

For example, an average boarding time is calculated after separating working days and holidays from each other in the record of boarding and alighting for a month. When the next day is a working day, a time with a little extra time before (a time a little earlier than) an average boarding time on working days is determined as the scheduled boarding time. On the other hand, when the next day is a holiday, a time with a little extra time before (a time a little earlier than) an average boarding time on holidays is determined as the scheduled boarding time. If the boarding times on holidays vary widely and the next day is a holiday, manual may be selected at step S31.

If manual is selected at step S31, main control ECU 408 waits for an input of a specified scheduled boarding time at step S32. Main control ECU 408 waits for the input of the scheduled boarding time through an input and output interface 409. When the scheduled boarding time has been input through input and output interface 112 in the vehicle, main control ECU 408 waits until that information is communicated thereto at step S32. In this case, if a car navigation device is installed in the vehicle, a desired arrival time and information about a destination may be input in the car navigation device which searches for a route and calculates the scheduled boarding time backward in the vehicle.

When the processing of step S32 or step S33 ends, the entire processing of step S2 ends at step S34, and the control is moved to the flowchart in FIG. 3.

After the processing of step S2 and step S22 ends, the process proceeds to steps S3 and S23, respectively. At step S23, the vehicle transmits information about the vehicle's fuel efficiency and information about a running distance, while at step S3, the charging control device determines a required amount of power (Wh) for the next boarding based on the transmitted information about the vehicle's fuel efficiency and information about a running distance.

Figure 5:
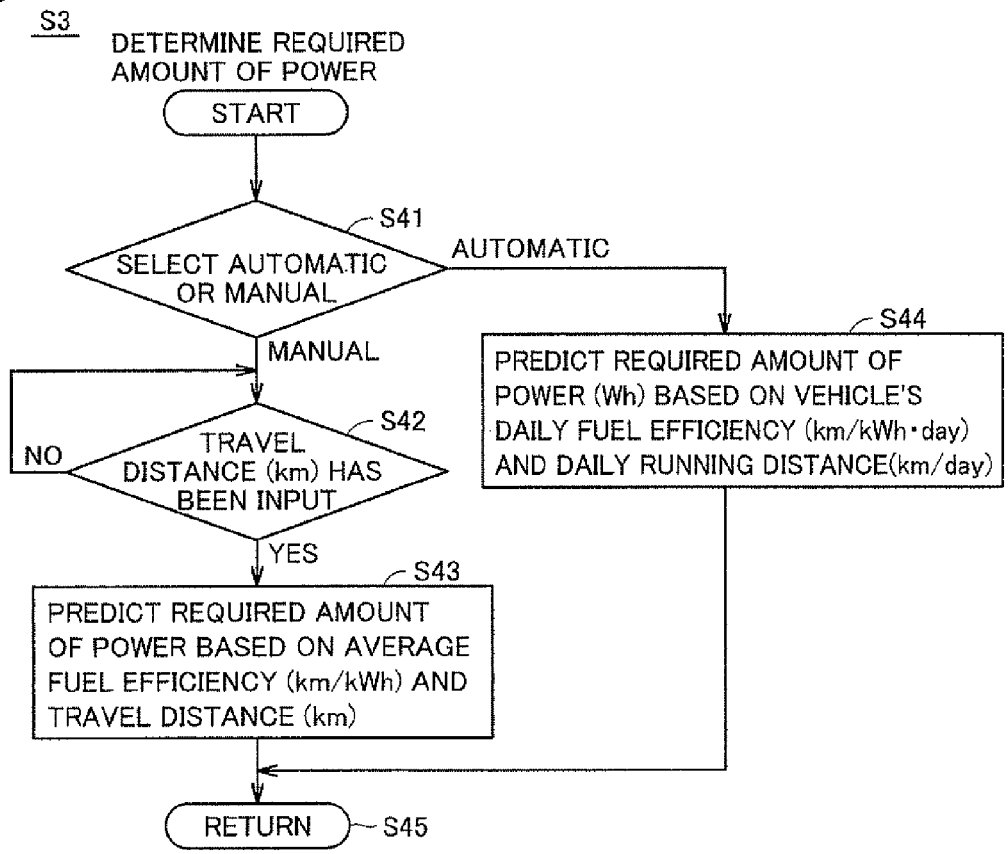
FIG. 5 is a flowchart illustrating details of processing at step S3.

FIG. 5 is a flowchart illustrating details of the processing of step S3.

Referring to FIG. 5, first at step S41, automatic or manual is selected. Selection between an automatic mode and a manual mode may be specified by the vehicle, or a mode set in advance in the charging device may be forcibly selected. If the automatic mode is selected at step S41, the process proceeds to step S44, where main control ECU 408 predicts the required amount of power (Wh) based on the vehicle's daily fuel efficiency (km/kWh·day) and the daily running distance (km/day) transmitted from the vehicle.

In recent years, vehicles having a function of summing up fuel efficiency have become more common. When the next day is a working day, for example, the required amount of power may be calculated by dividing an average value of the running distances on working days by the fuel efficiency having been summed up until now, and multiplying the result by an allowance coefficient. On the other hand, when the next day is a holiday, the required amount of power is calculated based on a distance with a little extra distance added to an average running distance on holidays. If the running distances on holidays vary widely and the next day is a holiday, manual may be selected at step S41.

If manual is selected at step S41, main control ECU 408 waits for an input of a travel distance at step S42. Main control ECU 408 waits for the input of the scheduled travel distance through input and output interface 409. When the scheduled travel distance has been input through input and output interface 112 in the vehicle, main control ECU 408 waits until that information is communicated thereto at step S42. In this case, if a car navigation device is installed in the vehicle, information about a destination may be input in the car navigation device which searches for a route and calculates a distance from a charging location in the vehicle, and that distance may be set as the scheduled travel distance. Following step S42, at step S43, main control ECU 408 predicts the required amount of power (Wh) based on the vehicle's daily fuel efficiency (km/kWh·day) and the scheduled travel distance (km) transmitted from the vehicle. For example, the required amount of power may be calculated by dividing the scheduled travel distance obtained at step S42 by the fuel efficiency having been summed up until now, and multiplying the result by an allowance coefficient.

When the processing of step S43 or step S44 ends, the entire processing of step S3 ends at step S45, and the control is moved to the flowchart in FIG. 3.

Referring again to FIG. 3, after the processing of step S3 and step S23 ends, the process proceeds to steps S4 and S24, respectively. At step S24, the vehicle transmits the state of charge (SOC) of the battery having been summed up based on a battery open-circuit voltage and a battery current to the charging control device. At step S4, the charging control device receives the SOC from the vehicle.

Then, at step S5, a required amount to be charged is calculated. The required amount to be charged is a difference obtained by subtracting an amount of power that can be output from the battery based on the current SOC of the battery from the required amount of power for the next boarding obtained at step S3. Subsequently, at step S6, power that can be allocated for charging for each time of day is calculated based on the contract power capacity of a house and the house's daily power consumption.

Figure 6:
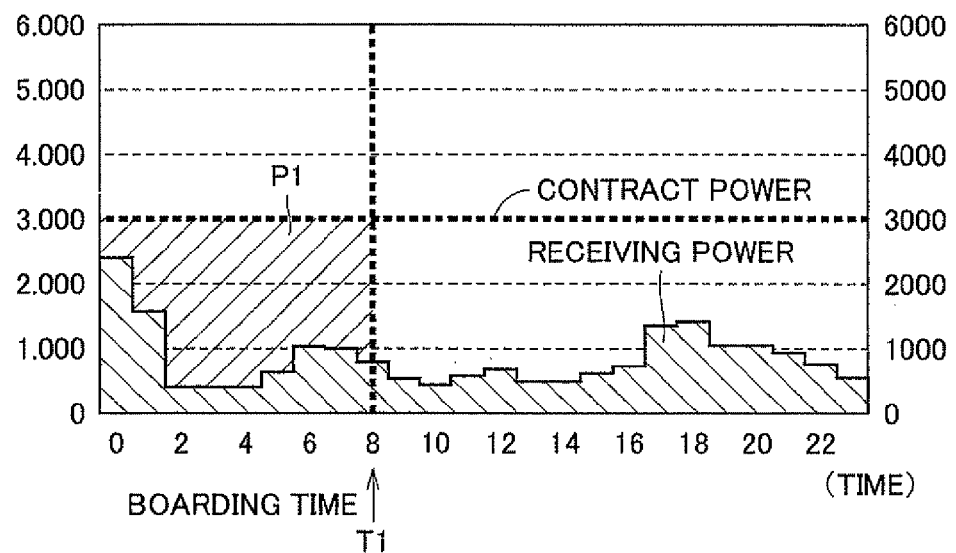
FIG. 6 explains power that can be allocated for charging.

FIG. 6 explains power that can be allocated for charging.

Referring to FIG. 6, the contract power capacity of this household is 3000 W (3 kW or 3 kVA), or 30 A in terms of contract ampere or contract current assuming that a receiving voltage is 100V.

The charging control device sums up actual values of receiving power other than that for charging the vehicle for each period of time, to calculate an average value. This is achieved by subtracting a current of branch circuits for charging from a current flowing through the entire distribution board, and recording the result.

A region P1 indicated with hatching lines from the current point in time until a scheduled boarding time T1 represents power that can be allocated for charging. The charging control device controls the charging schedule such that the power thus determined that can be allocated for charging at each period of time is not exceeded.

Referring again to FIG. 3, at step S7, the charging control device determines a charging speed based on the scheduled boarding time and a battery characteristic. The battery characteristic refers, for example, to a battery type or a battery capacity, and includes a maximum chargeable current determined by these conditions. At step S25, information on the battery of the vehicle corresponding to this battery characteristic is transmitted from the vehicle.

At step S7, the charging speed is determined such that the allocated power shown in FIG. 6 and the current determined by the battery characteristic are not exceeded. If it is expected that required charging will not be completed before the scheduled boarding time, a warning message may be output at the time of start of charging.

Then, at step S8, charging is performed at the determined charging speed. In order to control the charging speed, main control ECU 408 in FIG. 2 provides an instruction to current limitation unit 404 about a current value corresponding to a vehicle being charged for each period of time. Further, at step S9, the charging control device receives the SOC of the battery transmitted from the vehicle at step S26, and determines whether or not the required amount to be charged has been reached based on that information. If the required amount to be charged has not been reached, the process proceeds from step S9 to step S12, where whether the connectors for connecting the vehicle and the charging device to each other are connected or not is checked on a regular basis, and when the connection of the connectors has been maintained, the process then returns to step S8 where the charging is continued.

After transmitting the SOC to the charging control device at step S26, the vehicle determines whether or not the charging has been completed at step S27. The charging is determined to have been completed when the cable connector is no longer connected, or when notification of completion of the charging is given from the charging control device via the cable connector.

If the current charged amount has reached the required amount to be charged at step S9, the process proceeds to step S10, where it is determined whether or not the scheduled boarding time has come. If there is still time before the scheduled boarding time, the process proceeds from step S10 to step S11, where the charging control device receives the SOC of the battery transmitted from the vehicle at step S26, and determines whether or not the battery has been fully charged based on that information. If the battery has not yet been fully charged, the connection of the connector is checked at step S12, and then the process returns to step S8 where the charging is continued.

If the scheduled boarding time has come at step S10 and if the battery is determined to have been fully charged at step S11, the process proceeds to step S13, where notification of completion of the charging is given to the vehicle. Meanwhile, at step S27, as the process does not return to step S26 in the vehicle, regular transmission of the SOC is halted and the process ends at step S28.

When the notification at step S13 is completed and when it is determined at step S12 that the connector is not connected, the process proceeds to step S14, where the process of the charging control device ends.

Next, charging of a plurality of vehicles is described.

Figure 7:
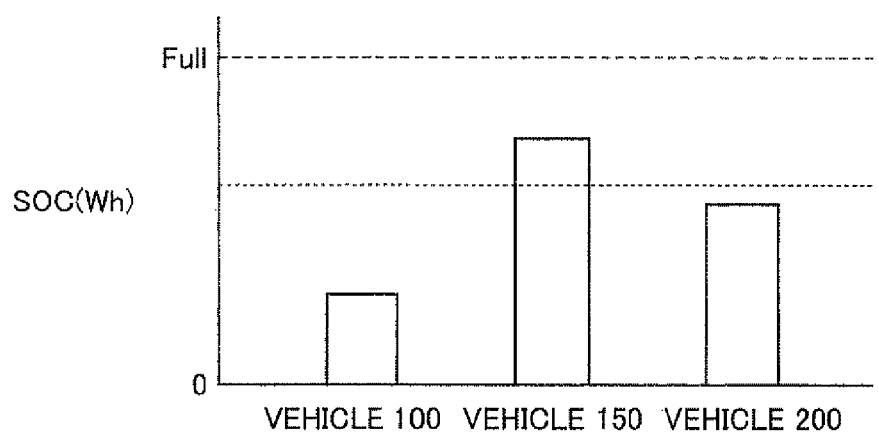
FIG. 7 illustrates an example of states of charge of batteries in a plurality of vehicles upon returning home.

FIG. 7 illustrates an example of the states of charge of the batteries in the plurality of vehicles upon returning home.

As shown in FIG. 7, the states of charge of the batteries upon returning home usually vary among vehicles 100, 150, 200.

Figure 8:
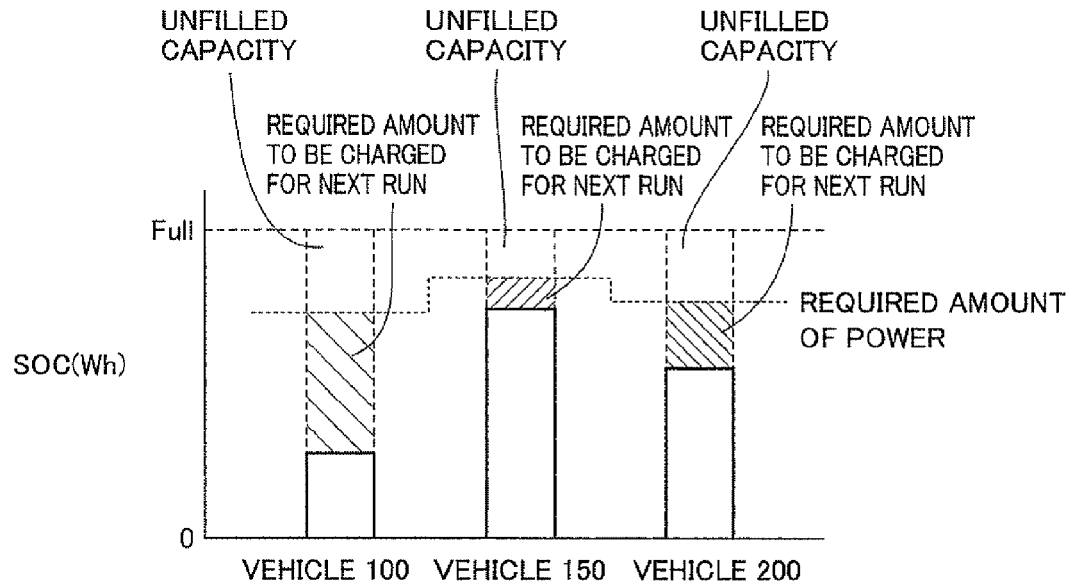
FIG. 8 illustrates an example of required amounts to be charged before the next boarding in the plurality of vehicles.

FIG. 8 illustrates an example of required amounts to be charged before the next boarding in the plurality of vehicles.

Since running distances for a day vary among the vehicles, required amounts of power also vary among the vehicles, as shown in FIG. 8. The required amount to be charged before the next run is obtained by subtracting an amount of the SOC upon returning home shown in FIG. 7 from this required amount of power. Accordingly, the required amount to be charged in each vehicle is preferentially fulfilled, and when there is still time left, the remaining unfilled capacity is filled up to full charge, so that inconvenience in use of each vehicle is less likely.

Figure 9:
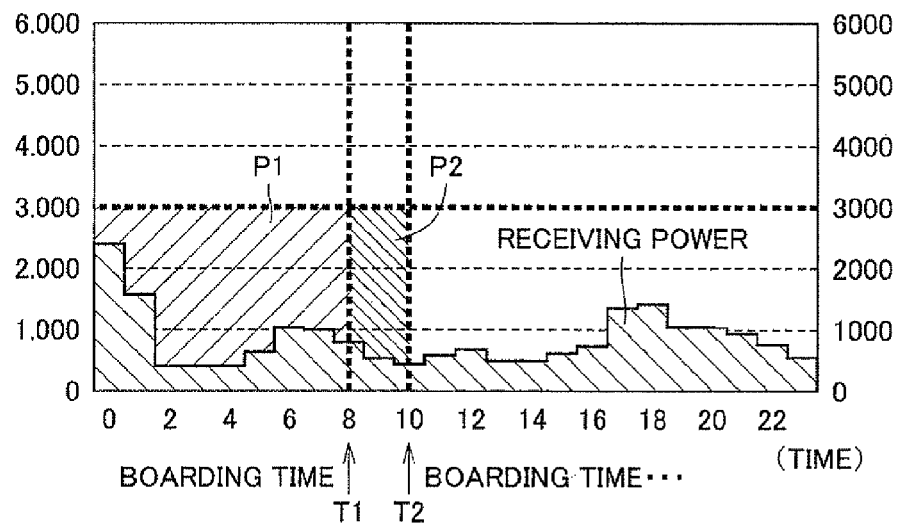
FIG. 9 illustrates power that can be allocated when a second vehicle is connected.

FIG. 9 illustrates power that can be allocated for charging when a second vehicle is connected. Referring to FIG. 9, the boarding time of the first vehicle is denoted as T1, and a boarding time of the second vehicle is denoted as T2. As compared to FIG. 6, it can be seen that an amount of power in a region P2 in addition to that in region P1 can be allocated in FIG. 9. Region P2, however, is a region that cannot be allocated for charging the first vehicle. Therefore, an order of charging needs to be determined in view of such a fact.

FIG. 10 is a flowchart for explaining a process executed in charging a plurality of vehicles.

Referring to FIG. 10, connection of the connectors is detected at step S51, the scheduled boarding times are determined at step S52, the required amounts of power (Wh) for the next boarding are determined at step S53, SOCs of the batteries are detected at step S54, and the required amounts to be charged are calculated at step S55. The processing from steps S51 to S55 corresponds to that from steps S1 to S5 in FIG. 3, and details thereof were already described with reference to FIG. 3 and therefore will not be repeated here.

Following step S55, at step S56, amounts of power that can be allocated for charging are calculated based on contract power capacity of the house and the house's daily power consumption. In the case shown in FIG. 9, for example, when the first vehicle is connected, a schedule is set such that region P1 is used for charging the first vehicle. When the second vehicle is connected, a schedule is set such that region P2 is allocated preferentially for the second vehicle having a later boarding time, and the remaining region P1 is used to initially charge either the first or the second vehicle having a higher priority.

Then, at step S57, the charging speeds are determined based on the scheduled boarding times and the battery characteristics of the cars. As described with regard to step S7 in FIG. 3, the battery characteristics of the vehicles having the connectors connected for charging at that time are acquired through communication.

At step S52 to step S57, information for setting the schedule of charging the vehicles is collected. During this collection of a series of information, at step S58, it is detected whether or not a connector of another vehicle has been newly connected to the charging device. If new connection is detected, the process returns to step S52, and the processing of information collection at steps S52 to S57 is executed again.

If new connection is not detected at step S58, the process proceeds to step S59, where the scheduled boarding times of the respective connected vehicles are compared to determine priority. Here, during a period of time when only a certain car can be charged at step S56, that car is preferentially charged and that charged amount is subtracted from a scheduled amount of power to be charged for that car.

Then, at step S60, a vehicle having the highest priority is charged. Here, in charging control device 400 in FIG. 2, main control ECU 408 sets a charging path such that charging power is supplied to the vehicle having the higher priority by controlling switches 414, 424.

Then, at step S61, it is detected even during charging whether or not a connector of another vehicle has been newly connected to the charging device. If new connection is detected, the process returns to step S52, and the processing of information collection at steps S52 to S57 is executed again.

If new connection is not detected at step S61, the process proceeds to step S62, where it is determined whether or not the required amount to be charged has been reached in the vehicle currently being charged. If the required amount to be charged has not been reached in the vehicle being charged at step S62, the process proceeds to step S60 where the charging is continued.

If the required amount to be charged has been reached in the vehicle being charged at step S62, the process proceeds to step S63. At step S63, it is detected whether or not a connector of another vehicle has been newly connected to the charging device. If new connection is detected, the process returns to step S52, and the processing of information collection at steps S52 to S57 is executed again.

If new connection is not detected at step S63, the process proceeds to step S64. At step S64, it is determined whether or not primary charging, namely, charging to a required amount to be charged for the next boarding, has been completed in all vehicles.

If there is still a vehicle in which charging to the required amount to be charged for the next run has not been completed at step S64, the process proceeds from step S64 to step S65. At step S65, a vehicle in which the required amount to be charged has been charged is temporarily excluded from targets to be charged, and the remaining vehicle(s) is (are) given higher priority. The process then proceeds to step S60, where charging of the vehicle now having the highest priority is started.

If it is determined at step S64 that the primary charging has been completed in all vehicles, the process proceeds to step S66, where it is determined whether or not there is a vehicle having time left before its scheduled boarding time. A vehicle still having time to be charged at step S66 is successively charged to fill unfilled capacity (see FIG. 8) at step S67. This unfilled capacity may be filled by charging each vehicle little by little successively, or may be filled by continuously charging one vehicle until full charge and then charging the next vehicle. Further, the priority of charging does not need to be based on the scheduled boarding times, but may be determined based on other factors. For example, power may be supplied equally to each vehicle, or the vehicles may be charged in the ascending order of SOC.

If there is no time left for charging at step S66, or if there is no vehicle having unfilled capacity after completion of step S67, the charging control ends at step S68.

[Modification 1]

A storage battery has lower charge efficiency with increase in temperature thereof. While some hybrid vehicles can select an EV running mode of running only with a motor by turning off an engine, after excessive EV running, a temperature of a battery may increase to such a degree as lowering charge efficiency. In that case, it is economical to charge another vehicle having a battery at a suitable temperature mounted thereon. If charging is performed based on the priority determined by the scheduled boarding times at step S59 in FIG. 10, however, a vehicle at a high temperature and low in charge efficiency may be selected as a target to be charged. Thus, there is still room for improvement.

Accordingly, when a target vehicle is determined at step S59, a battery temperature may be measured and acquired by temperature sensor 103, 203 in FIG. 2 in each vehicle, so that a vehicle having a battery temperature higher than a prescribed threshold value is excluded from the target to be charged or is given lower priority.

If a vehicle that had the highest priority has been excluded from the target to be charged due to its battery temperature higher than the threshold value, a vehicle that had the next highest second priority is selected as a target to be charged, and charged. Then, upon completion of the charging of the selected vehicle, the temperature is measured and acquired again at step S59, and if the temperature has become lower than the threshold value, the vehicle having the highest priority is selected as a target to be charged in accordance with the priority. If the temperature has not yet become lower than the threshold value, a vehicle which is uncharged and has the next highest priority is selected (if it has a low battery temperature) as a target to be charged.

It is conceivable that uncharged vehicles may all have temperatures higher than the threshold value, for example, a case where only one vehicle is connected, and that one vehicle has a battery temperature higher than the threshold value. Alternatively, a case where two vehicles have returned almost simultaneously may be expected. In such cases, charging may be performed with the priority being placed on ensuring a charging time period even though charge efficiency is low, or charging may not be performed until after the battery is at a suitable temperature with the priority being placed on energy efficiency.

In this modification, the vehicle transmits information for calculating the charge efficiency such as a temperature to the charging control device, and the charging control device calculates (or ranks) the charge efficiency of each vehicle. Alternatively, each vehicle may calculate and transmit charge efficiency to the charging control device without transmitting a temperature, and the control device may compare the charge efficiency of each vehicle. The information for calculating the charge efficiency is not limited to a temperature, but may be other information as well.

[Modification 2]

In the morning of a cold day and the like, prior to a scheduled boarding time, preparatory air conditioning for conditioning in-vehicle air to a comfortable temperature may be performed by operating an air conditioner using a timer and the like. Since power that can be output from a battery is lowered at a low temperature, call air conditioning may be performed also from the viewpoint of preheating a battery. When preparatory air conditioning is to be performed, power consumed during the air conditioning should also be added to a required amount to be charged.

In this case, a driver sets the preparatory air conditioning through a navigation touch panel screen or a dedicated switch in the vehicle. The setting may set a time to start the preparatory air conditioning, or may set a time to start the preparatory air conditioning relative to a scheduled boarding time, such as ten minutes prior to the scheduled boarding time. Then, the vehicle transmits the setting of ON/OFF of preparatory air conditioning, as well as the time to start the preparatory air conditioning or the scheduled boarding time and the time of the preparatory air conditioning to the charging control device.

If the time information including the time to start the preparatory air conditioning or the scheduled boarding time is obtained, that information can be used in determining the scheduled boarding time at step S32 in FIG. 4.

Further, when the required amount of power for the next boarding is calculated at step S3 in FIG. 3 or at step S53 in FIG. 10, charging control device 400 in FIG. 2 acquires information about the presence or absence of preparatory air conditioning from each vehicle. For a vehicle in which preparatory air conditioning is to be performed, charging control device 400 calculates the required amount of power by additionally including an amount of power for the preparatory air conditioning.

The amount of power for the preparatory air conditioning may be a prescribed value with some margin, or may be set from a map and the like based on a difference between the current room temperature and a target temperature.

Consequently, a possibility of insufficient charging is lowered even in a vehicle having a function of preparatory air conditioning.

[Modification 3]

As shown in FIGS. 1 and 2, vehicles to be charged under the control of charging control device 400 include electric cars such as vehicles 100, 150, and a hybrid vehicle such as vehicle 200.

When there are both an electric car and a hybrid vehicle as targets to be charged as described above, the electric car running only with charged power may have a higher priority than the hybrid vehicle carrying a fuel such as gasoline or the like.

In order to execute such a process, at step S57 in FIG. 10, information about a type of the vehicle, that is, whether the vehicle is an electric car or a hybrid vehicle, is transmitted along with the information about the battery characteristic from the vehicle to the charging control device. As to prioritization, the processing at step S59 in FIG. 10 may be changed such that electric cars are ranked according to their scheduled boarding times, and then hybrid vehicles are ranked therebelow according to their scheduled boarding times. Alternatively, the processing at step S59 in FIG. 10 may be changed such that vehicles are initially ranked according to their scheduled boarding times regardless of the type of the vehicles, and if their scheduled boarding times are identical to one another or within a range of prescribed time, the ranking is modified to give a higher priority to electric cars.

Additionally, hybrid cars have varying distances that can be run depending on a remaining amount of fuel (such as gasoline). Thus, a remaining amount of fuel may be reflected in determining the priority. There are various possible ways to reflect a remaining amount of fuel, and for example, when calculating the required amounts to be charged at step S55 in FIG. 10, an amount to be charged corresponding to the remaining amount of fuel may be subtracted from the required amount to be charged in vehicles larger in a remaining amount. Alternatively, the processing at step S59 in FIG. 10 may be changed such that vehicles are initially ranked according to their scheduled boarding times regardless of the type of the vehicles or the remaining amount of fuel, and if their scheduled boarding times are identical to one another or within a range of prescribed time, the ranking is modified to give a higher priority to electric cars, and also to give a higher priority to a vehicle having a smaller remaining amount of fuel among hybrid vehicles.

The present invention is collectively described below with reference to FIGS. 1, 10 and the like. The charging control device of the present embodiment is charging control device 400 for independently controlling charging of power storage devices in a plurality of vehicles, respectively, each having the power storage device mounted thereon, from an external power supply, and includes a state of charge detection unit (step S54) for detecting a state of charge of the power storage device when each vehicle and the external power supply are coupled to each other, an expected power consumption calculation unit (step S53) for detecting an expected amount of power consumption for each of the plurality of vehicles, a required-amount-of-power-to-be-charged calculation unit (step S55) for calculating a required amount of power to be charged for each vehicle based on the detected state of charge and the expected amount of power consumption, a use time detection unit (step S52) for detecting a time to start use of each vehicle, a charging schedule setting unit (step S59) for determining a charging schedule of a charging time period and an amount of power to be charged for each vehicle based on the required amount to be charged and the time to start use, and a control unit (step S60) for causing the power storage device mounted on the vehicle to be charged according to the charging schedule.

As described in modification 1, preferably, charging control device 400 may be arranged to further include a charge efficiency calculation unit for calculating charge efficiency of each power storage device by modifying step S59 in FIG. 10. The charging schedule setting unit sets the charging schedule further based on the charge efficiency.

As described in modification 2, preferably, charging control device 400 may be arranged to further include a preparatory air conditioning information acquiring unit for acquiring instruction information about preparatory air conditioning prior to start of operation which is set in at least any of the plurality of vehicles. An expected-amount-of-power-consumption detection unit (modified step S53) calculates the expected amount of power consumption including power required for the preparatory air conditioning as well. The charging schedule setting unit (step S59) sets the charging schedule based on the instruction for the preparatory air conditioning.

Preferably, the control unit causes the power storage device in each of the plurality of vehicles to be charged to its required amount of power to be charged, and then continues to cause the power storage device to be charged to full charge beyond the required amount of power to be charged in at least any of the vehicles (step S67).

As described in modification 3, preferably, the control unit acquires the vehicle type (electric car or hybrid vehicle) from each vehicle. The charging schedule setting unit determines the charging schedule based on the vehicle type.

Preferably, like vehicle 200 in FIG. 2, the vehicle includes an internal combustion engine (engine 232) and fuel tank 234 for storing fuel for the internal combustion engine. The charging schedule setting unit sets the charging schedule based on a remaining amount of fuel in the fuel tank.

As described above, according to the present embodiment, a plurality of vehicles are charged according to a use schedule within a range of contract capacity so that a possibility that charging is completed at a boarding start time is increased, and unavailability of a required car at a desired time of use is less likely.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

The invention claimed is:

1. A charging control device for independently controlling charging of power storage devices in a plurality of vehicles, respectively, each having said power storage device mounted thereon, from an external power supply, comprising:
    an electronic control unit having control logic configured to:
        detect a state of charge of each of said power storage devices after each vehicle and said external power supply are coupled to each other;
        detect an expected amount of power consumption for each of said plurality of vehicles by determining a required amount of power for a boarding of a vehicle of the plurality of vehicles based on information about a vehicle fuel efficiency and information about a running distance transmitted from the vehicle;
        calculate a required amount of power to be charged for each vehicle based on the detected state of charge and the expected amount of power consumption;
        detect a time to start use of each vehicle;

determine a charging schedule of a charging time period and an amount of power to be charged for each vehicle based on said required amount of power to be charged and said time to start use;

control charging of the power storage device mounted on said vehicle according to said charging schedule;

to calculate charge efficiency of each of said power storage devices; and set said charging schedule further based on said charge efficiency by giving a vehicle having a low charge efficiency a lower priority of charging.

2. A charging control device for independently controlling charging of power storage devices in a plurality of vehicles, respectively, each having said power storage device mounted thereon, from an external power supply, comprising:

an electronic control unit having control logic configured to:

detect a state of charge of each of said power storage devices after each vehicle and said external power supply are coupled to each other;

detect an expected amount of power consumption for each of said plurality of vehicles by determining a required amount of power for a boarding of a vehicle of the plurality of vehicles based on information about a vehicle fuel efficiency and information about a running distance transmitted from the vehicle;

calculate a required amount of power to be charged for each vehicle based on the detected state of charge and the expected amount of power consumption;

detect a time to start use of each vehicle;

determine a charging schedule of a charging time period and an amount of power to be charged for each vehicle based on said required amount of power to be charged and said time to start use;

control charging of the power storage device mounted on said vehicle according to said charging schedule;

acquire instruction information about preparatory air conditioning prior to start of operation which is set in at least any of said plurality of vehicles;

calculate said expected amount of power consumption including power required for said preparatory air conditioning as well; and set said charging schedule based on the instruction information about said preparatory air conditioning.

3. The charging control device according to claim 1, wherein said electronic control unit causes the power storage device in each of said plurality of vehicles to be charged with said required amount of power to be charged, and then continues to cause the power storage device to be charged to full charge beyond said required amount of power to be charged in at least any of the vehicles.

4. The charging control device according to claim 1, wherein said electronic control unit acquires a vehicle type from each of said vehicles, and determines said charging schedule based on said vehicle type.

5. The charging control device according to claim 1, wherein each of said vehicles includes an internal combustion engine and a fuel tank for storing fuel for said internal combustion engine, and said electronic control unit sets said charging schedule based on a remaining amount of fuel in said fuel tank.

6. The charging control device according to claim 1, wherein said electronic control unit is further configured to:

acquire instruction information about preparatory air conditioning prior to start of operation which is set in at least any of said plurality of vehicles;

calculate said expected amount of power consumption including power required for said preparatory air conditioning as well; and set said charging schedule based on the instruction information about said preparatory air conditioning.

* * * * *